Jan. 19, 1965  F. E. PAUGH  3,165,902
WATER TOWER

Filed Aug. 21, 1962  3 Sheets-Sheet 1

INVENTOR.
FRED E. PAUGH
BY

Jan. 19, 1965   F. E. PAUGH   3,165,902
WATER TOWER
Filed Aug. 21, 1962   3 Sheets-Sheet 2
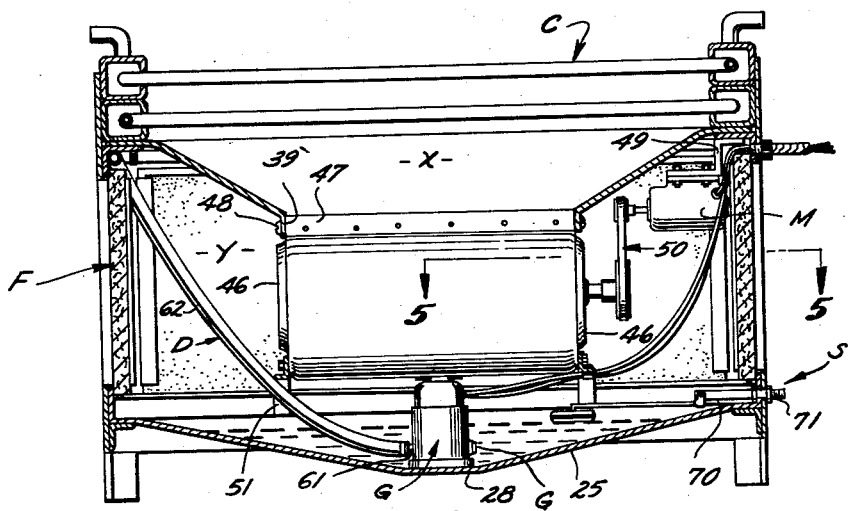
FIG. 3
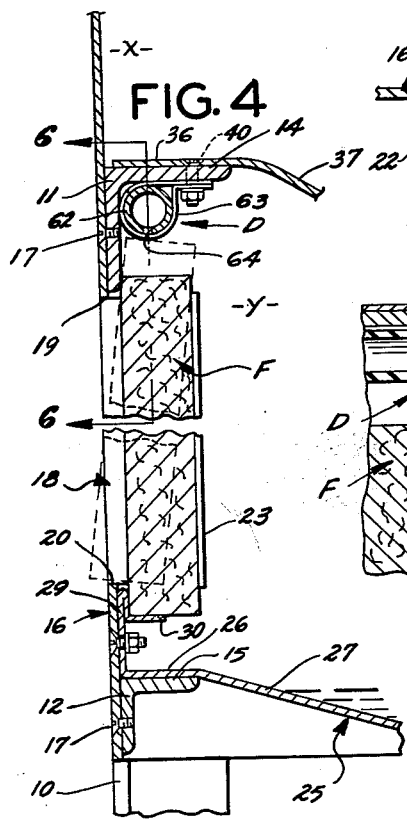
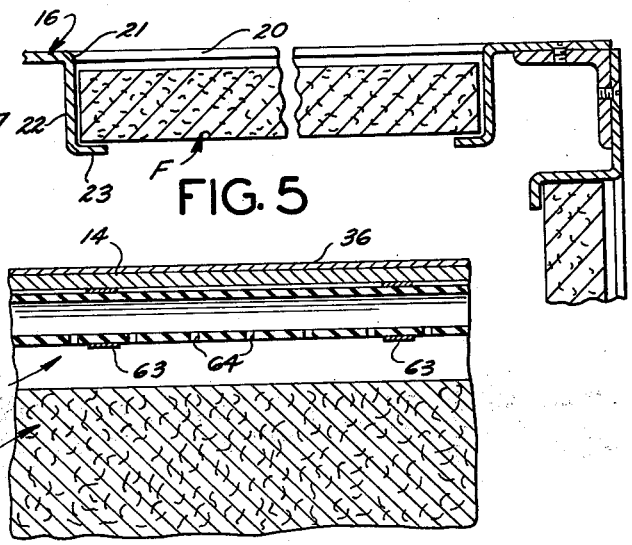
FIG. 5
FIG. 6
INVENTOR.
FRED E. PAUGH
BY

INVENTOR.
FRED E. PAUGH

United States Patent Office 3,165,902
Patented Jan. 19, 1965

3,165,902
WATER TOWER
Fred E. Paugh, Bell, Calif.
(6003 S. Atlantic, Maywood, Calif.)
Filed Aug. 21, 1962, Ser. No. 218,343
5 Claims. (Cl. 62—171)

This invention relates to a cooler and is more particularly concerned with a cooling apparatus of the general type or class commonly referred to as cooling towers.

It is common practice throughout industry to use water or other similar fluid as a heat exchange medium for mechanical equipment such as compressors, generator plants and the like. In certain circumstances a simple conventional radiator, in close proximity to the piece of equipment is adequate to cool the coolant. In many other situations where several pieces of water-cooled equipment are employed and said equipment is in close quarters or where space prohibits the provision of a separate and closely related radiator, it is common practice to provide a water tower type cooler of considerable capacity, remote from the equipment, to cool the coolant for the several pieces of equipment.

The ordinary water tower is arranged at the exterior of the building in which the equipment it serves is housed and is normally positioned where, in respect to the climatic conditions and surrounding structures and terrain, it will function most efficiently.

The ordinary water tower is a simple heat exchanger and includes a coil through which the coolant flows, and irrigating means for spraying or otherwise depositing water on the exterior of the coil. The water deposited on the exterior of the coil, due to the heat, is rapidly evaporated off and into the atmosphere, carrying with it, heat from the coil and resulting in effectively cooling the coolant within the coil.

Water towers are normally open structures through which air is free to circulate in order to carry off the vapor, or are provided with suitable air circulating means, such as blowers or fans, to create a forced draft through and by the coils and to displace the said vapors.

While such structures are very effective when new, the water deposited on the coils and evaporated, immediately starts to buildly a mineral or alkali deposit. Such deposits soon become sufficiently heavy or thick to serve as insulators and render the structures ineffective. In areas where the natural water supply is very hard, that is, heavily saturated with minerals, a water tower of the general character referred to above may operate efficiently for only a week or two before the coils are so laden with alkali as to be rendered useless.

To overcome this difficulty, the prior art has attempted to keep the coils dry and to circulate air thereby which air has been moved through a curtain of cascading water or through a chamber in which water is introduced in the form of a spray or fog. The function of the water, in these structures is to lower the ambient temperature of the air before it is directed onto the coils.

While such attempts have reduced the problem of alkali deposits forming on the coils, it has by no means solved it, as the air being handled, in addition to becoming water saturated, through the normal or expected evaporative process, also serves as a carrier for the smaller droplets of raw, mineral-ladened water which is deposited on the coils with the same adverse effects.

Further, moving long volumes of air through curtains and/or showers of water to cool it, it is not effective, as considerable volumes of water must be moved and the air traveling therethrough sets up patterns and eddies which cause excess air to flow in spots and which blow and carry the water away in a manner which is not desirable and which should be avoided.

Further, in such structures much of the minerals freed by evaporation in the cascade or in the spray chamber is suspended in the air stream and while some is scrubbed from the air by cascading water or by the spray, a major portion thereof is carried by the moist, humid air and is deposited on the coils.

An object of the present invention is to provide a novel water tower wherein raw water is not deposited on the coils and the coils are not subject to being ladened with alkali or mineral deposits.

Another object of the present invention is to provide a water tower type cooler wherein the air directed by the coils and serving to carry off the heat from the coils, is filtered and free of lime or colloidal minerals and is cooled below the temperature of the ambient air by water evaporation.

A feature of the present invention is to provide a structure of the character referred to wherein the temperature of the cooling air is lowered by drawing it through water saturated filter and evaporator cooling pads.

Still another object of this invention is to provide a structure of the character referred to having water recirculating means to maintain the filter pads moistened and to circulate water which has flowed through the pads so that a minimum of raw, mineral-ladened water is used.

It is an object of this invention to provide a structure of the character referred to which is highly effective and efficient; a structure which is small, neat and compact and a structure which is easy and economical to manufacture, install and maintain.

The various objects and features of my invention will be understood from the following detailed description of typical preferred forms and applications of my invention, throughout which description reference is made to the accompanying drawings, in which:

FIG. 3 is a sectional view taken as indicated by line 3—3 on FIG. 1;

FIG. 4 is a sectional view taken as indicated on line 4—4 of FIG. 1;

FIG. 5 is a sectional view taken substantially as indicated by line 5—5 of FIG. 3;

FIG. 6 is a view taken as indicated by line 6—6 on FIG. 4;

Figure 1:
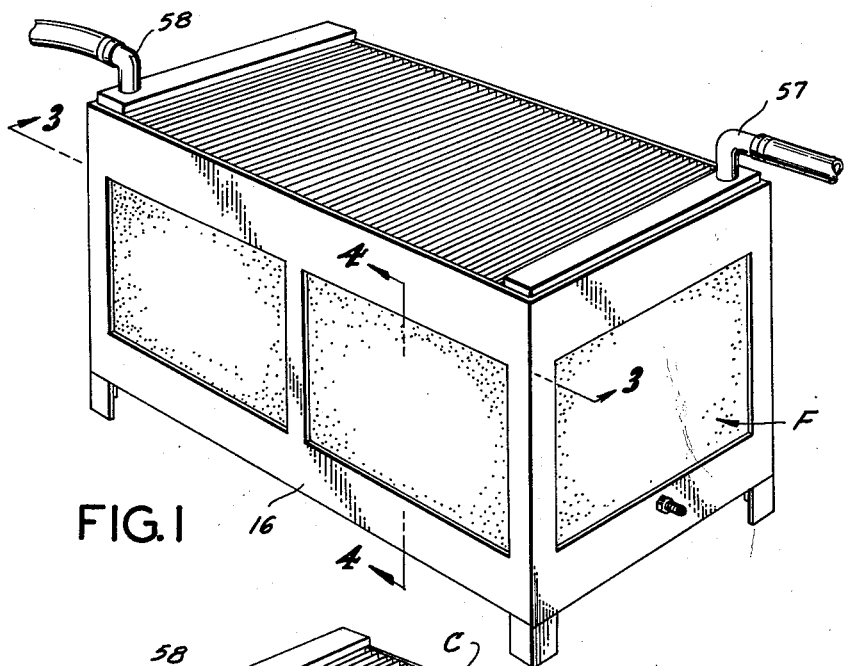
FIG. 1 is a perspective view of my new water tower.
Figure 2:
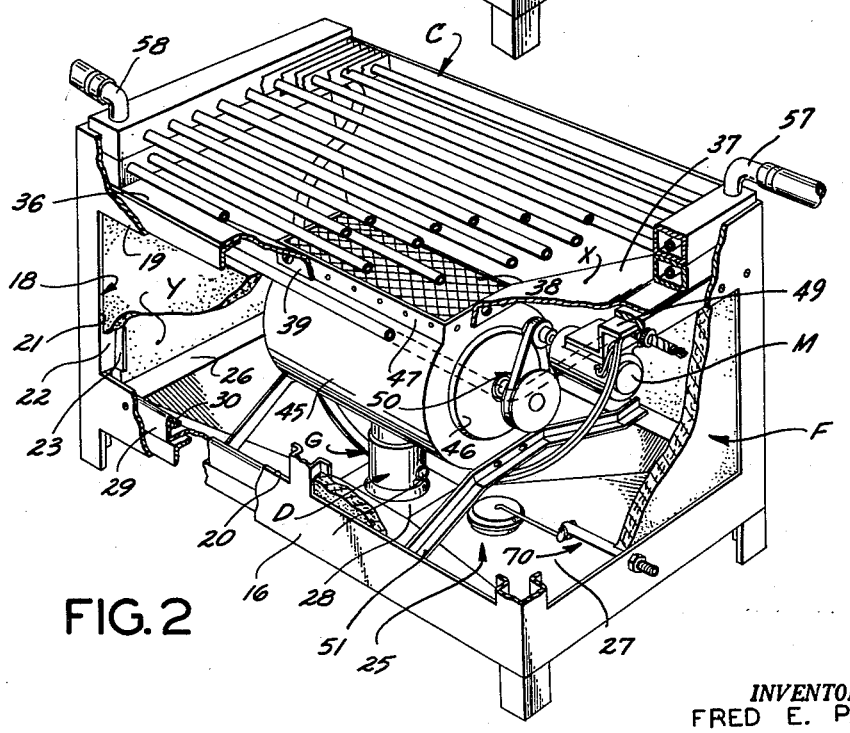
FIG. 2 is a perspective view of the structure shown in FIG. 1, having portions thereof broken away to show certain details of the construction.

The water tower A that I provide and shown in FIGS.

1–6 of the drawings, includes, generally, an upwardly-opening box-like housing H, an apertured partition P in the housing defining upper and lower chambers X and Y, air circulating means B carried by the partition to draw air from the lower compartment Y and to discharge it upwardly into and through the upper chamber X, coils C arranged in the upper compartment Y and adapted to handle a liquid coolant to be cooled, and a plurality or filtering and evaporative cooling pads E related to the lower compartment Y. The construction that I provide further includes water circulating or irrigation means D for for the pads E.

The housing H is an elongate structure and includes generally an open frame F fabricated of angle iron and including four vertically-spaced corner posts 10, upper and lower vertically-spaced stringers 11 and 12 extending longitudinally each side of the frame and fixed to and extending between the posts 10.

The lower ends of the posts 10 extend below the lower stringers 12 to establish supporting legs for the construction.

The several stringers 11 and 12 have horizontally-disposed flanges which project laterally inwardly into the confines of the frame and cooperate to define horizontal, upwardly-disposed, rectangular supports 14 and 15, respectively.

Each side of the frame F is provided with a flat vertically-disposed sheet metal panel 16, which panel is fixed to the posts and the stringers related thereto, by suitable screw fasteners 17.

In practice, the several panels can be separate parts or, if desired, can be established of a single sheet of material and wrapped about a frame F.

Each panel 16 is provided with one or more rectangular filter pad-receiving openings 18 having horizontal top and bottom edges 19 and 20 and vertical side edges 21. The openings 18 are of such extent and so positioned in the panels 16 to occur wholly within the area defined by the stringers and the posts defining each side of the construction.

The side edges 21 of the openings 18 are provided with inwardly-projecting flanges 22 having laterally inwardly-projecting lips or stops 23 along the inner vertical edges thereof. The flanges 22 and stops 23 are formed integrally with the panels and are established by a suitable stamping and forming operation.

Supported on the lower support 15 of the frame F is a bottom wall or pan 25, which pan closes the bottom of the housing H.

The pan 25 is a sheet metal part, rectangular in plan configuration and is characterized by a flat, horizontally-disposed marginal portion 26 which portion seats on the support 15 of the frame F, four inwardly and downwardly-inclined facets 27, there being one facet related to each side of the pan, a flat rectangular, horizontally-disposed bottom 28 at the center of the pan and with which the said facets converge. The pan 25 further includes an upwardly-projecting flange 29 about the perimeter of the said marginal portion 26 thereof which flange is adapted to occur adjacent the inner surface of the panels 16 and adjacent the bottom edges 20 of the openings 18 therein. The flange 29 is provided with an inwardly-projecting horizontal supporting flange 30, spaced below the upper edge thereof and upon which the filter pads are seated.

In the case illustrated, the support flange 30 which is coextensive with the flange 29 about the perimeter of the pan is formed integrally therewith by breaking or bending an extension of the flange 30 inwardly and then downwardly and by breaking or bending the outer portion of the said extension upwardly and inwardly.

In practice, the flange 30 could be interrupted about its perimeter and could be formed integrally with the panels 16, from extensions on the bottom edges 20 of the openings 18 in the panels in the same manner as set forth above. Still further, the flange 30 or flanges 30 whichever the case might be could be separate parts fixed to either the panels or the pan, as desired, or as circumstances require.

The partition P is a horizontally-disposed rectangular sheet metal part having a flat horizontally-disposed marginal portion 36 to rest or seat upon the upper support 14 of the frame F. The partition P has four inwardly and downwardly-inclined facets 37, one at each side of the partition and a central, rectangular opening 38, which opening is defined by the inner edges of said facets. The inner edges of the facets have downwardly-turned extensions defining a downwardly-projecting mounting flange 39 about the perimeter of the opening 38.

The partition P is fixed to the support 14 by suitable screw fasteners 40.

The partition P cooperates with the panels 16 and the pan 25 to define the lower chamber Y.

The upper portions of the panels 16 project above the support 14 of the frame F and cooperate with the partition P to define the upper chamber X, which chamber opens upwardly, as clearly illustrated in the drawings.

The air circulating means in the first form of the invention is a simple squirrel cage type blower having a cylindrical housing 45 within the openings 46 at each end, and an upwardly-projecting discharge duct 47. The blower B is arranged in the chamber Y, clear of the pan 25, and has its upwardly-projecting discharge duct 47 engaged in the opening 38 in the partition B. The duct establishes sliding engagement with the mounting flange 39 on the partition, and is fixed thereto by means of suitable screw fasteners 48, whereby the said blower is mounted on and carried by the partition P.

The blower B is driven by a suitable electric motor M, mounted in the upper portion of the chamber Y by means of a suitable mounting bracket 49 fixed to the frame F. The motor M is operatively coupled with the blower by a conventional pulley drive 50.

In practice, the blower B can be further supported by suitable means 51 fixed to the housing 45 of the blower, to extend transversely of the chamber Y and to seat on the lower support 15 of the frame F, or the marginal portion 26 of the pan 25, which marginal portion is supported on said support 15.

The coil C can vary widely in form and construction and is preferably a fin-type coil, which type of coil is a most effective heat transfer construction. This type of coil has previously been unsuitable for use in water towers, due to the tendency of the fins to collect and hold minerals deposited thereon by the water.

In the case illustrated, the coil C is shown as including a pair of longitudinally-spaced, laterally-extending, horizontally-disposed logs 55; a plurality of longitudinally-disposed, laterally and vertically-spaced flow tubes 56 extending between the logs; a plurality of elongate, vertically-disposed, longitudinally-spaced heat conducting fins 56' extending transverse the flow tubes 56 and parallel with the logs; an upwardly and outwardly-projecting inlet fitting 57 on one of said logs and an upwardly and outwardly projecting outlet fitting 58 on the other log. The inlet and outlet fittings 57 and 58 are connected with suitable flow ducts or hoses 59 and 60 extending between the cooler and the equipment or coolant conducting system with which the cooler is related.

The coil C is rectangular in plan configuration and corresponds in longitudinal and lateral extent with the inside longitudinal and lateral extent of the upper chamber X of the housing H. The coil C is positioned in the chamber X to seat on the upper support 14 of the frame and to occur in and overlie the upper open end of the chamber X.

The filtering and cooling pads E are simple rectangular pads of loosely matted excelsior or other suitable water absorbent fibrous material. The pads are equal in lateral extent, width and are slightly greater in vertical extent than the openings 18 in the panels 16, and are substantially equal in thickness with the space between the stops 23 and the inner surfaces of the panels.

The pads E are arranged in the lower chamber Y of the housing to occur adjacent and overlie the openings 18 in the panels 16.

The pads E are positioned in the housing H by inserting their upper edge portions inwardly through the openings 18 in the panel and against the stops 23 with which they are related then urging them upwardly in the housing, then urging their lower ends inwardly through the said openings and finally letting them drop into seated engagement on the supporting flange or flanges 30 as clearly illustrated in FIG. 4 of the drawings.

In practice, the exact construction of the pads E can vary materially. In one typical construction the pads are provided with wire mesh facings to retain the matting and are provided with frames established of wire mesh or perforated sheet material to maintain them in proper configuration.

Since the construction of the pads can vary very widely without affecting the novelty of the present invention, I have chosen to show the pads in a very generic manner and will not burden this application with further unnecessary illustration and description thereof.

The water circulating or irrigating means D that I provide includes, an electrically driven recirculating pump G seated or mounted on the bottom 28 of the pan 25 and having an inlet fitting 60 and an outlet fitting 61, and an elongate irrigating hose 62 connected with the said outlet fitting and extending upwardly and about the housing the overlie the upper eges of the pads E. The irrigating hose is fixed to the underside of the upper support 14 of the frame by suitable metal clips 63 engaged with the fasteners 40 employed to secure the partition P to the support and is provided with a plurality of longitudinally-spaced downwardly-disposed apertures 64 to direct water onto the pads E.

In practice, the pump G is under control of either a hydrometer or thermostatically-controlled switching mechanism (not shown), responsive to the temperature or humidity of the air in either the chamber X or the chamber Y, or the temperature of the coolant issuing from the construction.

Excess water which flows from the pads E into the pan 25 is drawn from the pan by the pump G and is recirculated through the pads.

In addition to the foregoing, the construction further includes a supply means S to maintain a predetermined water level in the pan 25. The means S includes a float valve 70 arranged within the chamber Y. The valve 70 is engaged through the frame F at one side of the construction and has a hose nipple 71 at the exterior of the construction to connect with a suitable water supply line (not shown), and a suitable float 72 within the chamber Y to engage the surface of the body of water within the chamber and to control the valve.

With the means G that I provide, it will be apparent that a proper water supply is constantly maintained in the pan 25 and that the pads E are maintained at a proper moisture level to effectively cool the air drawn therethrough.

The construction set forth above is such that the pads E are maintained moist so as to effect evaporation of water and is such that water is not cascaded or sprayed or otherwise dispensed within the chamber Y so that raw water can be picked up and carried by the air stream.

In operation, the coolant is circulated through the coils C. The blower B draws air from the surrounding atmosphere through the moistened pads E, to be cooled thereby, and into the chamber Y, the blower B further draws the cooled and moistened air from the chamber Y, which air is, in addition to being cooled, filtered and dust-free and discharges it upwardly into and through the chamber X and through the coil C, where it picks up or absorbs heat from the coil, thereby affecting a heat transfer at the coil and reducing the temperature of the coolant circulating within the coil.

The air in the chamber X which is directed through the coils C is, while moisture-ladened and cool, mineral-free, with the result that minerals are not deposited on the coils 56 or the fins 56' thereof, and the coils operate effectively and efficiently indefinitely and are not subject to being ladened and encrusted with insulating mineral deposits and the like.

Figure 7:
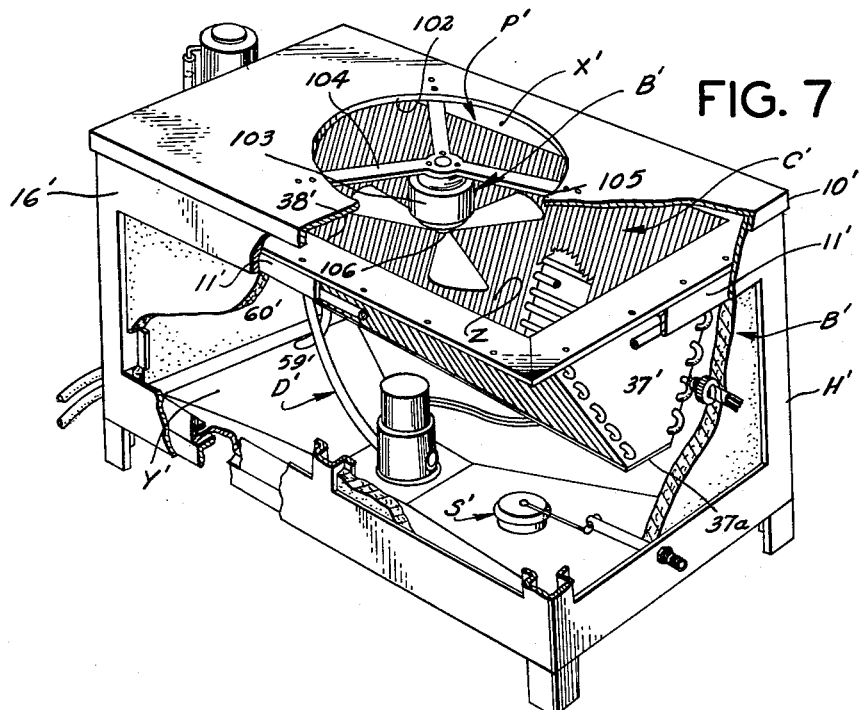
FIG. 7 is a perspective view of another form of the invention, with parts broken away to better illustrate the invention.
Figure 8:
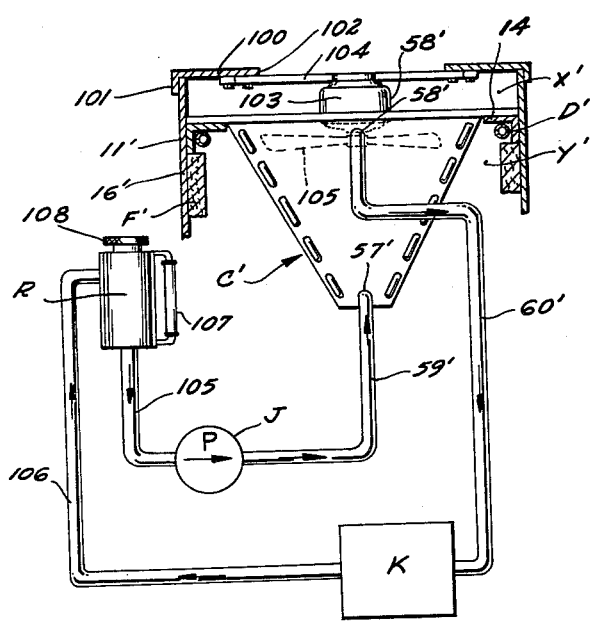
FIG. 8 is an end view of a portion of the structure shown in FIG. 7, and having a system diagram related thereto.

In the form of the invention shown in FIGS. 7 and 8 of the drawings, an arrangement of parts is provided which provides for a greater coil capacity without increasing the outside dimensions of the construction. This second form of the invention also provides for a more uniform flow of air through the coils.

The water tower A' provided in this second form of the invention can be and is shown as being identical in many respects with the first form of the invention.

The water tower A' includes a housing H' which is the same as the housing H in the first form of the invention. The tower A' also includes filtering and evaporative cooling pads E', water circulating and supply means D' and S', which are identical to similar elements and means in the first form of the invention.

This second form of my invention distinguishes from the first form of the invention in that the partition P', which is supported by the upper support 14' of the housing frame F' is provided with a rectangular opening 38' extending longitudinally of the partition and provided at its ends with depending, substantially triangular, downwardly-convergent plates 37' which plates serve to support the ends of a pair of elongate, rectangular coils C'.

The partition P', like the partition P in the first form of the invention, defines upper and lower chambers X' and Y' in the housing.

The coils C' are flat, rectangular, fin-type coils and are arranged in the housing to extend longitudinally between the plates 37'. Each coil is arranged to extend in a laterally-upwardly and outwardly-inclined plane with respect to the central vertical plane of the housing, with its lower edge extending between the lower vertex corners of the end plates and its upper edge extending parallel with and adjacent one side of the opening 38' in the partition. The two coils are inclined in opposite directions, that is, they converge laterally inwardly and downwardly toward each other and cooperate to establish an upwardly-opening, V-shaped trough Z closed at its ends by the plates 37'. In practice, a longitudinal bottom plate 37a is provided to extend between the lower ends of the plates 37' and close the bottom of the trough Z.

The coils C' occur in the lower chamber Y' of the housing and the trough Z established by the coils and plates opens upwardly and communicates with the upper chamber X' as clearly illustrated in the drawings.

The coils C' are provided with suitable inlet and outlet fittings 57' and 58' at one end of the construction and with which the coolant return line 59' and coolant delivery line 60' connect. The lines 59' and 60' extend from the exterior of the housing H' and into the lower chamber Y', where they connect with the fittings 57' and 58', through suitable openings provided in the lower portion of the housing (not shown).

From the foregoing, it will be apparent that the coils C', plates 37', and partition P' establish a unitary assembly that can be easily and conveniently engaged in and removed from the housing H' for servicing and the like. It will be further apparent that by arranging the coils C' in the pattern set forth above and illustrated in the drawings, a material increase in effective cooling or coil area is established.

The air-circulating means B in this second form of the invention is arranged in the upper chamber X' and/or trough Z, rather than in the lower chamber Y as in the first form of the invention. The means B' serves to draw air through the pads E into the lower chamber Y', through the coils C' into the trough Z and upper chamber Y' and thence out of the upper chamber and into the atmosphere.

The upper end of the housing H' and chamber X' is closed by a sheet metal cover 100. The cover 100 is a substantially flat, horizontally-disposed, rectangular unit and rests on the upper edge of the panels 16' fixed to and extending about the frame F' of the housing. The cover 100 has a downwardly-extending panel engaging flange 101 about its perimeter and a central, round, air exhaust or outlet opening 102.

The air-circulating means B' is shown as including an electric motor 103 mounted in the chamber X' in axial alignment with the opening 102, by means of a spider-type mounting bracket 103 which extends across the opening 102, and a fan 104 fixed to the drive shaft 105 of the motor and disposed within the trough Z. The fan 104, when driven, serves to exhaust air out of the trough Z and chamber X', thereby drawing air through the pads E', chamber Y' and coils C'.

In practice, a tubular air flow conducting tube can be carried by the cover 100 in axial alignment with the opening 102, to depend from the cover and occur about the fan 104 so as to establish a more effective and efficient air flow through the construction.

With the second form of my invention, it will be apparent that the coils C' are not exposed to the elements as is the coil C in the first form of the invention and are protected from solar heat energy and from foreign matter outside of the construction by the cover 100.

In FIG. 8 of the drawings, I have shown a typical closed circuit system with which the water towers A and/or A' can be advantageously related. The system is shown as including a reservoir R, adapted to carry a supply of coolant, a suction line 105 extending from the reservoir R to a power-operated pump J, the discharge end of which is connected with the return line 59' extending to the inlet end of the water tower coils. The delivery line 60' connected with the outlet end of the coils C' connects with the equipment K to be cooled. A flow line 106 extends from the equipment K back to the reservoir.

In practice, the reservoir R is provided with a tube gauge 107 so that the liquid level in the reservoir can be readily determined and is further provided with a filler opening at its upper or top end having a pressure cap 108 related thereto.

With the system set forth above, it will be apparent that the coolant is handled by a closed circuit and is such that it is not subject to being contaminated or diluted with other materials or fluids, and is such that it is not subject to being boiled away.

It is to be understood that the present invention is primarily concerned with the arrangement and dispositioning of the filter and evaporative cooling pads, water supply or irrigating means, coolant-conducting coils and air-circulating means within a housing and that in practice, the particular details of construction illustrated and described in the drawings and preceding descriptive matter can be varied considerably without departing from the spirit of the invention.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A water tower including, a box-like housing having a top with an air discharge opening, vertical sides and a bottom, openings in the sides of the housing, evaporative cooling and filtering pads arranged within the openings, a fin-type coolant-conducting coil within the housing and air-circulating means within the housing and establishing a flow of air through the pads into the housing, through the coil and thence out through the discharge opening, an irrigating means in the housing and maintaining the pads moistened with water, said housing having a partition with a central opening therein defining upper and lower chambers in the housing, said lower chamber adapted to accommodate cool air flowing from the pads, said openings in the sides of the housing in which the pads occur communicating with the lower chamber, said coil being supported by the partition and overlying the opening therein, said air circulating means occurring within the upper chamber and drawing cool air upwardly from the lower chamber and through the coil.

2. A water tower including, a box-like housing having an open top, vertical sides and a bottom, openings in the sides of the housing, evaporative cooling and filtering pads arranged within the openings, a fin-type coolant-conducting coil within the housing and air-circulating means within the housing and establishing a flow of air through the pads into the housing, through the coil and thence out through the top of the housing, an irrigating means in the housing and maintaining the pads moistened with water, said housing having a partition with a central opening therein defining upper and lower chambers in the housing, said lower chamber adapted to accommodate cool air flowing from the pads, said openings in the sides of the housing in which the pads occur communicating with the lower chamber, said coil including two upwardly and outwardly divergent banks of fluid-conducting finned tubes defining an elongate upwardly opening trough, end plates at the ends of the banks of tubes closing the ends of the trough and fixed to and depending from the partition so that the coil occurs within the lower chamber and the trough defined thereby communicates with the upper chamber, said air-circulating means including a cover with a central discharge opening engaged over the top of the housing, a fan mounted within the upper chamber in axial alignment with said discharge opening, and exhausting the air in said upper chamber out through the said opening in the cover.

3. A water tower including a box-like housing having a fabricated angle iron frame defining vertically spaced upper and lower, horizontal, rectangular supports, vertical sheet metal panels fixed to the exterior of the frame, a horizontal, upwardly opening rectangular sheet metal pan engaged on the lower support to close the bottom of the housing and having downwardly and inwardly inclined sides converging at a flat bottom, a horizontal rectangular sheet metal partition engaged on the upper support and having a central opening, a pair of downwardly convergent fin-type coolant conducting coil panels supported by the partition to bridge the opening therein and depending therefrom, said panels, pan, partition and coil panels defining a lower chamber in the housing, said partition and coil panels defining an upwardly opening chamber in the body, the panels having rectangular openings communicating with the lower chamber, a plurality of flat rectangular filter pads, mounting means releasably holding the pads in position over the openings in the panels, air circulating means in the upper chamber and drawing air through the pads, thence through the coil panels and discharging the air through the top of the housing, and water distributing means to moisten the pads.

4. A structure as set forth in claim 3 wherein said mounting means includes, a horizontal upwardly disposed inwardly projecting supporting flange spaced below the bottom edge of each opening in the panels and adapted to support the bottom edge of the pads, inwardly projecting vertically disposed flanges at each side of the openings in the panels to slideably engage the sides of the pads and laterally, inwardly projecting stops on the inner side edges of the side flanges to engage the rear surface of the pads, said pads being equal in lateral extent with the openings in the panels and greater in vertical extent than the openings in the panel, whereby the upper and lower outer edge portions thereof engage and stop on the inner surfaces of the panels adjacent the upper and lower edges of the openings with which they are related.

5. A structure as set forth in claim 3 wherein said water distributing means includes, an electric recirculating pump within the lower chamber and supported on the bottom of the pan, an elongate duct extending from the pump to overlie the upper edges of the pads and having longitudinally spaced, downwardly disposed apertures therein, and water supply means to maintain a predetermined water level in the pan including, a float valve in the lower chamber adjacent the pan and connected with a water supply duct.

References Cited in the file of this patent
UNITED STATES PATENTS

| | | |
|---|---|---|
| 2,636,371 | Stephens | Apr. 28, 1953 |
| 2,778,203 | Griffith | Jan. 22, 1957 |
| 2,788,198 | Anderson | Apr. 9, 1957 |